United States Patent
Hamzeh

(10) Patent No.: US 9,379,854 B2
(45) Date of Patent: Jun. 28, 2016

(54) SIGNALING WITH NOISE CANCELLATION USING ECHOES

(71) Applicant: Cable Television Laboratories, Inc., Louisville, CO (US)

(72) Inventor: Belal Hamzeh, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 19 days.

(21) Appl. No.: 14/083,564

(22) Filed: Nov. 19, 2013

(65) Prior Publication Data

US 2015/0139349 A1 May 21, 2015

(51) Int. Cl.
- *H04B 1/62* (2006.01)
- *H04L 1/20* (2006.01)
- *H04L 25/02* (2006.01)

(52) U.S. Cl.
CPC .. *H04L 1/20* (2013.01); *H04B 1/62* (2013.01); *H04L 25/028* (2013.01)

(58) Field of Classification Search
CPC ...... H04B 1/0475; H04B 1/10; H04B 1/1018; H04B 1/1027; H04B 1/1081; H04B 1/62; H04L 25/026; H04L 25/0262; H04L 25/0264; H04L 25/028; H04L 25/0292; H04L 25/03025; H04L 1/20

USPC .......... 375/254, 257, 282–285, 333, 360, 361

See application file for complete search history.

(56) References Cited

U.S. PATENT DOCUMENTS

| | | | |
|---|---|---|---|
| 6,687,235 B1 * | 2/2004 | Chu | 370/286 |
| 2003/0169653 A1 * | 9/2003 | Choo et al. | 369/44.32 |
| 2003/0210749 A1 * | 11/2003 | Asjadi | H04L 27/2647 375/260 |
| 2005/0163196 A1 * | 7/2005 | Currivan | H04B 1/71 375/144 |
| 2010/0285733 A1 * | 11/2010 | Gore et al. | 455/7 |

* cited by examiner

*Primary Examiner* — Young T Tse
(74) *Attorney, Agent, or Firm* — Great Lakes Intellectual Property, PLLC.

(57) ABSTRACT

Signal transport with noise cancellation is contemplated. The noise cancellation may be facilitated with a transmitter configured to induce echoes in a signal desired for transport in order to facilitate subsequently retrieving signal components associated with noise influenced portions of the transported signal from non-noise influence portions of the transported signal.

14 Claims, 5 Drawing Sheets

No Burst Noise:

| | Tf | Tf-τ | Tf-2τ | Tf-3τ | Tf-4τ | Tf-5τ | T0 |
|---|---|---|---|---|---|---|---|
| s = | | E | D | C | B | A | |
| Y' = | k.E | E + k.D | D + k.C | C + k.B | B+k.A | A | |
| z = | | E | D | C | B | A | |

Fig. 4

$\leftarrow$ Tb $\leftarrow$ τ ← 70

Burst Noise @ D:

| | Tf | Tf-τ | Tf-2τ | Tf-3τ | Tf-4τ | Tf-5τ | T0 |
|---|---|---|---|---|---|---|---|
| s = | | E | D | C | B | A | |
| Y' = | k.E | E + k.D | 0 | C + k.B | B+k.A | A | |
| z = | | E | D | C | B | A | |

Fig. 5

SIGNALING WITH NOISE CANCELLATION USING ECHOES

TECHNICAL FIELD

The present invention relates to transporting signaling over a wired and/or wireless communication medium, such as in a manner that cancels or removes shot, burst or other noises introduced during signal transportation.

BACKGROUND

Communication lines can suffer from shot noise arising from different sources. Depending on the shot noise amplitude and duration, the impact of the shot noise on the link performance can vary. Signal processing techniques, such forward error correction (FEC) or those described in U.S. patent application Ser. No. 13/538,456, entitled Interleaved Signaling, and U.S. patent application Ser. No. 13/841,313, entitled Orthogonal Signal Demodulation, the disclosures of which are hereby incorporated by reference in their entireties, may be sufficient to compensate for some noise bursts. Some signal processing techniques may be limited to correcting noises having their intensity and duration bounded within certain limits. For high intensity burst noises, particular ones that are long in duration, such signal processing techniques may not be adequate, or would require complex designs for both a transmitter and a receiver.

One non-limiting aspect of the present invention proposes a methodology for cancelling shot burst or other noises in the communication link while preventing or otherwise limiting the addition of any requirements on the transmitter or the receiver, and optionally in a manner that it is technology agnostic and thus capable of handling various communication protocols.

BRIEF DESCRIPTION OF THE DRAWINGS

FIGS. 4-5 illustrate tables burst-less signal frames in accordance with the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
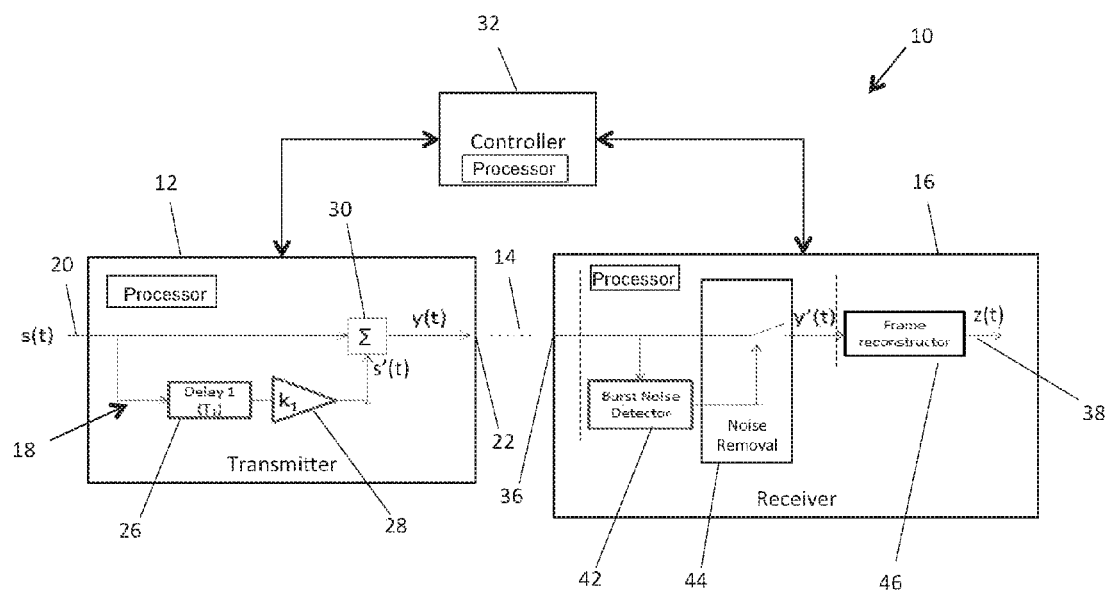
FIG. 1 illustrates a system for transporting signals in accordance with one non-limiting aspect of the present invention.

FIG. 1 illustrates a system 10 for transporting signals in accordance with one non-limiting aspect of the present invention. The system 10 is shown with respect to a transmitter 12 being configured to transport signaling over a communication medium 14 for receipt at a receiver 16. The receiver 16 may be configured to further process the transported signaling for output to a device (not shown) and/or interfacing with a user. The system 10 may be configured to facilitate transporting virtually any type of signaling between a first location/device (e.g., the transmitter 12) and a second location/device (e.g., the receiver 16). Optionally, the signaling transported over the communication medium 14 may traverse one or multiple wired and/or wireless mediums before reaching the receiver 16, such as in the manner described in the patent applications referenced above and/or described in U.S. patent application Ser. No. 13/769,288, filed Feb. 16, 2013, and entitled Multiple-Input Multiple-Output (MIMO) Communication System, the disclosure of which is hereby incorporated by reference in its entirety. The noises and other affects on the transported signaling may differ depending on the communication medium 14, signaling path and/or other variables associated with the route(s) or path(s) used to transport signaling between the transmitter 12 and the receiver 16 or a particular receiver selected from a plurality of receivers The signaling may be transmitted and/or processed as analog or digital signaling and is interchangeable referred to herein as a signal frame. The signal frame may be one of a plurality of signal frames being transmitted in succession or multiplexed for delivery over the communication medium 14. The configuration, duration, bandwidth and other characteristics of the signaling frame may vary depending on the particular signaling and/or medium 14 associated with the transmitter 12 and/or receiver 16. One non-limiting aspect of the present invention contemplates ameliorating and/or eliminating noises introduced to the signal frames while being transported over the communication medium 14 by cancelling, removing or otherwise limiting the influence of shot, burst or other noises, which are interchangeably referred to herein as burst noises, optionally without reading data or otherwise processing content/information carried within the signaling, signaling frames or packets. An initial step to facilitating removal of the burst noises may be achieved by configuring the transmitter 12 to include a weighted tap delay line 18 connected to an input 20 receiving a signal frame (S). The delay line 18 may be provided between the input 20 and an output 22 of the transmitter 12 to facilitate generating a time-delayed copy or echo (S') of the input signal (S) desired for transport over the communication medium 14.

The weighted tap delay line 18 is shown to generate the time-delayed copy (S') using a delay 26 and an amplifier 28 for exemplary non-limiting purposes as the present invention fully contemplates other configurations being suitable to achieving a similar result. A combiner 30 may be included to facilitate combining the input signal (S) and the time delayed copy (S') into a signal frame (Y) for transmission through the output 22. A controller 32 may be include as a standalone item and/or integrated separately into one or both of the transmitter 12 and/or the receiver 16 to facilitate controlling operations thereof in accordance with the present invention. The controller 32 may be include a non-transitory computer-readable medium having a plurality of instructions stored thereon, which may be operable with a processor (not shown) or other feature, to facilitate the controls and other operations contemplated herein. The controller 32 may be configured to dynamically adjust the delay 26 and the amplifier 28 in a controllable many to achieve variable time delay, which is referred to herein as τ, and/or variable gain, which is herein referred to as k. One non-limiting aspect of the present invention contemplates the controller 32 selecting the τ and k values as function of a noise burst likely to affect the signal (Y) during transport.

The controller 32 may be configured to monitor signaling carried over the communication medium 14 to determine characteristics of the noise burst likely to affect the signal (Y). The system shown in FIG. 1 is described with respect to a single burst noise in order to simply the presentation, however, as described below in more detail, the system 10 may be similarly configured to facilitate cancelling multiple burst noises/interferences. The controller 32 may optionally determine the affecting burst noise through other means besides monitoring the transported signaling, such as from information provided from another device tasked with determining burst noises and/or from design parameters specified by a network administrator. One non-limiting aspect of the present invention contemplates assessing the affecting burst noise to determine its length or duration and setting the τ and k values as a function thereof. The τ value may be set to achieve a delay approximately equal to or slightly longer than the duration of the noise burst to be canceled. The k value may be set to magnify or de-magnify time-delayed signal (S') in order to emphasize or de-emphasize its characteristics when subsequently combined with the input signal (S). Optionally, the k value may be set to provide a gain of one in order to pass the time-delayed signal (S') without emphasis.

The transmitter 12 may communicate the combined signal frame (Y) over the communication medium for receipt at an input 36 of the receiver 16. The receiver 16 may process the signal frame (Y) in order to generate an output signal frame (Z) for transmission through an output 38. The output may be connected to a modem, settop box (STB), television, cellular tower, remote antenna, computer or virtually any other type of device having capabilities to process the output signal (Z) and/or to relay or otherwise facilitate continued transmission of the output signal (Z) to another device or communication medium. The receiver 16 may be configured in accordance with the present invention to operate according to the echo, delay or other manipulations made by the transmitter 12 to the input signal (S). The controller 32 may be configured to direct the receiver 16 as to operations of the transmitter 12 or the corresponding operations of the receiver 16 and/or data may travel with or precede the transported signal frame (Y) to facilitate the corresponding receiver 16 processing. One non-limiting aspect of the present invention contemplates the receiver 16 being configured to reconstruct the input signal frame (S) from the combined signal frame (Y) using recursive noise cancellation processes designed to generate the output signal frame (Z) without the influence of burst noise. The recursive processing may require the receiver 16 to at least temporarily store an entire length of the transported signal frame (Y) and thereafter solve for unknown signal components using known signal components, such as through linear algebra, Gaussian elimination and/or row reduction mathematical techniques.

The transmitter receiver 16 is shown to include a burst noise detector 42, a noise removal component 44 and a frame reconstructor 46 to facilitate the contemplated noise cancellation. The burst noise detect may be configured to determine the occurrence or placement of the burst noise within the transported signal (Y). The burst noise detector 42 determine the occurrence and/or other characteristics of the burst noise by monitoring the transported signal (Y), receiving instructions or information from the controller and/or receiving an input from other components used to facilitate the communication medium, such as a cable modem terminal system (CMTS) or headend unit. The burst noise detector 42 may be configured to dynamically assess the position or placement of the burst noise within the transport signal frame (Y) as the burst noise positioning may vary from frame to frame due to frame size variations, transient influences, network congestion and/or any number of other interference related phenomena. The noise removal component 44 may operate in concert with the burst noise detector to facilitate removing the burst noise from the transported signal frame (Y). The noise removal component may include an input configured to receive the transported signal frame (Y) and an output configured to pass a burst-less signal frame (Y') to an input of the frame reconstructor 46.

The noise removal component 44 may be configured to remove the burst noise according to instructions received from the burst noise detector 42, such as by driving a noise influenced portion of the transported signal frame (Y) by opening a switch, driving the noise influenced portion to zero using an amplifier having a gain of zero (not shown) and/or performing some other suitable signal manipulation. In the event no burst noise affects the transported signal frame (Y) or was otherwise not detected, the noise removal component may pass the transported signal frame (Y) as the burst-less signal frame (Y'), e.g., without processing the transported signal frame (Y). The frame reconstructor 46 may be configured to reconstruct the input signal (S) as the output signal (Z). The frame reconstructor 46 may perform digital signal processing (DSP), optionally including conversion of analog signaling to digital signaling, and/or through other suitable signal processing means such as filtering. The frame reconstructor may be configured to perform recursive operations to estimate the noise influenced portion of the burst-less signal (Y') driven to zero from other non-noise influenced portions of the burst-less signal (Y'), i.e., to solve for unknown components or values of the signal (Y') using known components or values. In the event no burst noise is present in the transported signal (Y), the frame reconstructor may generate the output signal (Z) by subtracting or otherwise removing the time-delayed, echo signal (S') from the transported signal (Y), such as with a feedback circuit mirroring the weighted tap delay having an inverse value for k.

Figure 2:
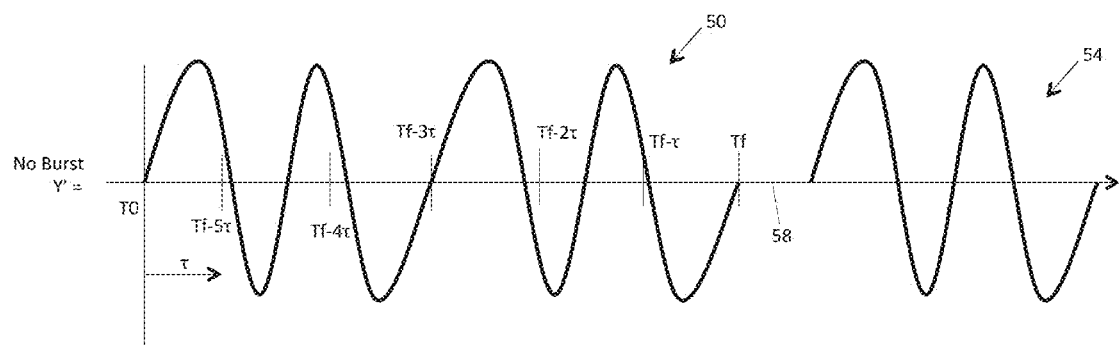
FIGS. 2-3 illustrate graphs of burst-less signal frames in accordance with the present invention.
Figure 3:
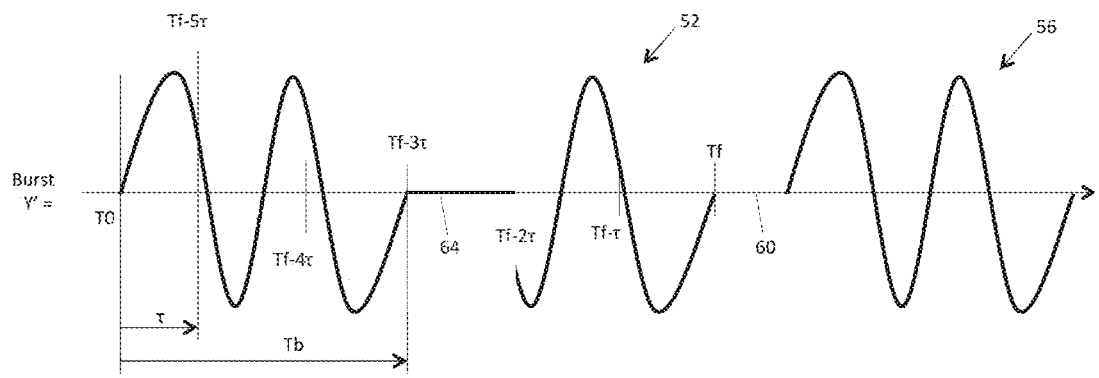

FIGS. 2-3 illustrate graphs of first and second burst-less signal frames (Y') 50, 52 generated with the noise removal component as contemplated by the present invention. The first the burst-less signal frame (Y') 50 illustrates when no burst noise is detected in the transported signal (Y). The second the burst-less signal frame (Y') 52 illustrates when a single burst noise is detected in the transported signal (Y). The signal frames 50, 52 are shown as being causal, sinusoidal shaped signal frames for exemplary non-limiting purposes and may correspond with any other type of signal suitable susceptible to the noise cancellation techniques contemplated herein. Portions of similar, following signal frames 54, 56 are also shown for exemplary purposes to illustrate the system 10 being configured to facilitate transporting and cancelling noise for additional signals where each signal frame is separated with a blank period 58, 60 or other form of demarcation. The burst-less signal frames (Y') 50, 52 are shown as comprising a beginning at T0 and an ending at Tf with additional references to intervals set according to the τ value used by the controller 32 to facilitate the time-delay echo combination. The second burst-less signal frame (Y') 52 is shown with a burst noise arising between Tf−3τ and Tf−2τ where the noise removal component drove the corresponding, noise-influenced portion 64 of the transported signal (Y) to zero for a period of time equal to τ. The timing references and their corresponding positioning are merely exemplary means for identifying different portions of the burst-less signal frame (Y') as additional references may be similarly used and/or re-positioned.

FIGS. 4-5 illustrate tables of first and second burst-less signal frames (Y') 68, 70 relative to the input signal frame (S) and the output signal frame (Z) as contemplated by the present invention. Rather than depicting the signal frames as time varying shapes, the tables 68, 70 illustrate the signal frames as segments generated in accordance with the present invention relative to the input signal frame (S). The input signal frame (S) is shown to include five segments, labeled as A, B, C, D and E, in order to visually explain the recursive processing performed by the frame reconstructor to facilitate the contemplated noise cancellation. The first table 68 illustrates the first burst-less signal frame (Y') when no noise is detected and the second table 70 illustrates the second burst-less signal frame (Y') when noise is detected, i.e., with the noise influenced portion of the transported signal frame (Y) corresponding with segment D of the input signal frame (S) being driven to zero for a time period corresponding with $\tau$. The segments including multiple segment references, i.e., those having the scaler from a previous segment (e.g., k.A, k.B, etc.), are shown to represent segments having an echo or copy of the preceding input signal frame segment.

The frame reconstructor 46 may be configured in accordance with the present invention to store an entire length of the burst-less signal frame (Y'), i.e., T0-Tf, and then solve for the output signal frame (Z) by analyzing known and unknown components. The frame reconstructor 46 may be made aware of the time delay or echo added to form the transported signal frame (Y) such that the initial portion of the burst-less signal frame (Y') may be known to be echo-free and any portion thereafter, i.e. any portion after $\tau$, may be known to include an echo and therefore require removal of the echo in order to retrieve or otherwise reconstruct the input signal frame (S). In the case of no burst noise, the frame reconstructor 46 may generate the output signal frame (Z) relatively simply by taking the known components/values associated with the first segment A and solving for the unknown components of the following segments in succession, i.e., once the values associated with A are known, the next segment B can be solved for by removing the correspondingly known k.A components and thereafter repeating the process using the next newly known value (B then C then D) until each segment of the signal frame (Z) is known. In the case of a burst noise, a similar process may be followed for the portions received before the burst affected portion and thereafter the frame reconstructor 46 may solve for multiple unknowns once the entire signal frame is received, i.e., the highlight segments D and E may be solved for using linear algebra or other suitable technique.

Figures 6, 7, 8:
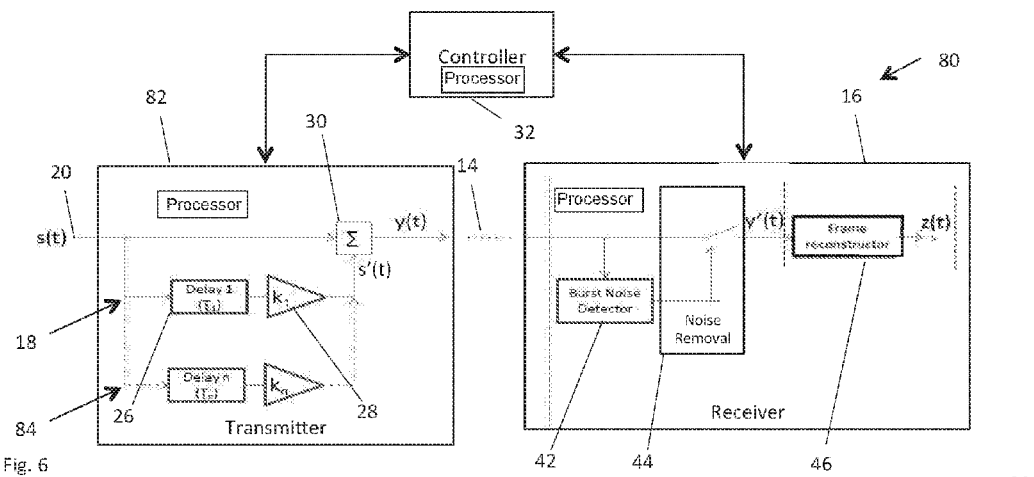
FIG. 6 illustrates a system for transporting signals in accordance with one non-limiting aspect of the present invention.
FIGS. 7-8 illustrate tables of burst-less signal frames in accordance with the present invention.

FIG. 6 illustrates a system 80 for transporting signals in accordance with one non-limiting aspect of the present invention. The system 80 is configured to facilitate canceling multiple burst noises within a transported signal frame (Y). A transmitter 82 may be configured in a manner similar to the above-described transmitter 12 with respect to being configured to generate the transported signal frame (Y) as a function of and input signal frame (S). The transmitter 82 is shown to include n number of weighted tap delay lines 18, 84 where the number of delay lines (n) are controllably selected, optionally on a per frame basis, by the controller 32 or other device configured to assess noise influences on the transported signal frame (Y). One non-limiting aspect of the present invention contemplates the controller 32 generating n copies or echoes (S') of the input signal frame (S) where the value of n is selected to correspond with a number of discrete, burst noises likely to affect the transported signal frame (Y), i.e., n is a whole number greater than or equal to one when one or more noise burst are deemed likely. Each delay line 18, 84 may be configured to delay and scale the corresponding signaling by a period of time ($\tau$) and a scaler ($k_i$) where each line after the first line is additionally weighted in a successive manner, e.g., the first delay line is delayed by a factor of 1$\tau$ and scaled by a factor of $k_1$, the second delay line is delayed by a factor of 2$\tau$ and scaled by a factor of $k_2$, etc. The time value $\tau$ may be selected to correspond with the longest burst noise and the scaler value k may be selected to provide desired weighting, optionally with the weighting being commonly set to 1 for each line if scaling is not desired.

The system 80 may operate similarly to that described above with respect to the receiver 16 being configured to process the transported signal frame (Y) into a burst-less signal (Y') with the burst noise detector 42 and the noise removal component 44 and thereafter generating an output signal (Z) with the frame reconstructor 46. The burst noise detector 42 may be configured to detect occurrence of multiple burst noises within the transported signal frame (Y) and to facilitate driving corresponding portions of the burst-less signal frame (Y') to zero. As described above, the burst-less signal frame (Y') may be driven to zero by adjusting a gain of an amplifier, opening a switch or performing another suitable operation. The present invention is predominately described with respect to the noise affected portions of the transported signal frame (Y) being driven to zero for period of time equal to $\tau$ such that each noise affected portion of the transported signal frame (Y) is driven to zero for the same amount of time. This is done in order to simplify the presentation of the present invention as the present invention fully contemplates driving each noise affected portion of the transported signal frame (Y) to zero for individually selectable periods of time, e.g., the length of the noise affecting each noise affected portion may be used as the time period for which the corresponding portion of the burst-less single frame (Y') is driven to zero.

FIGS. 7-8 illustrate tables 90, 92 for first and second burst-less signal frames (Y') relative to the input signal frame (S) and the output signal frame (Z) as contemplated by the present invention. The first table 90 illustrates the first burst-less signal frame (Y') when no noise is detected and the second table 92 illustrates the second burst-less signal frame (Y') when noise is detected, i.e., with the noise influenced portions relating to time measured relative segments B and D of the input signal frame (S) such that the correspond portions of the burst-less signal frame (Y') are driven to zero for a time period approximating T. The segments including multiple segment references, i.e., those having the scaler from a previous segment (e.g., k.A, k.B+k2.A, etc.), are shown to represent segments having an echo or copy of each preceding input signal frame segment with at least a portion of the segments including multiple time-delayed copies of different portions the input signal frame segments. The first and second tables 90, 92 illustrate signal processing contemplated by the present invention when attempting to remove two burst noises from the transported signal frame (Y). The transported signal frame (Y) would be longer, i.e., the length of the transported signal frame (Y) from T0 to Tf would increase by $\tau$, for each additional burst noise to be cancelled, assuming that each noise affected portions of the burst-less transported signal frame (Y') would be driven to zero for the same amount of time ($\tau$).

The frame reconstructor 46 may recognize the portions of the burst-less signal frame (Y') being affected by echoes and those that are not affected by echoes in order to determine the known and unknown signal components. Based thereon, the frame reconstructor 46 may rely upon linear algebra or other multiple equation mathematics to solve for unknown signal frame components (those occurring after the first burst noise) based on known single frame components (those occurring before the first burst noise). As shown in the highlighted segments of FIG. 8, the frame reconstructor may be required to solve for four unknown values (B, C, D and E) based on a single known value (A) by solving for the four unknown values using the four equations associated with the portions of the non-zeroed segments occurring after the first burst noise. The frame reconstructor may be configured in this manner to reconstruct the input signal frame (S) as the output signal frame (Z) due to the transmitter generating the transported signal frame (Y) with multiple copies of the input signal frame (S), thereby enabling recovery of a noise affected portion of the transported signal frame (Y) from a later arriving copy of that same portion of the input signal frame (S) unaffected by the noise. The ability of the controller to dynamically adjust the length of $\tau$ on a per input signal frame (S) basis may be beneficial in limiting the length of the transported signal frame (Y), and thereby the bandwidth consumption.

Figure 9:
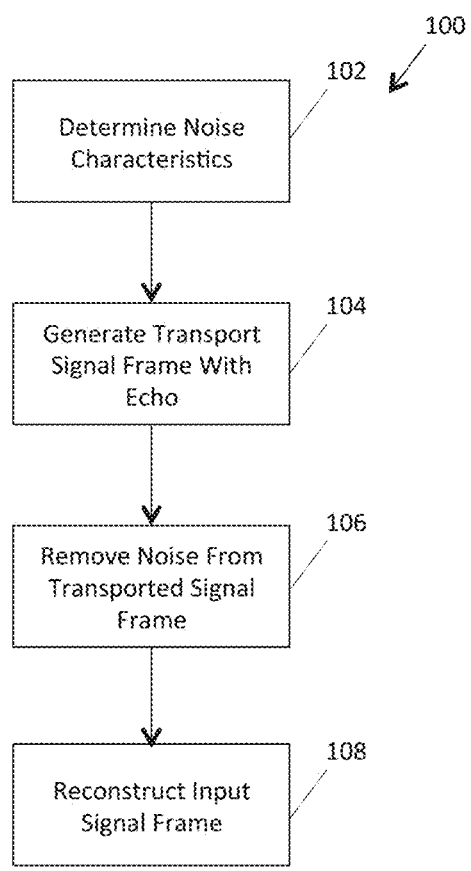
FIG. 9 illustrates a flowchart of a method for transporting signaling in accordance with one non-limiting aspect of the present invention.

FIG. 9 illustrates a flowchart 100 of a method for transporting signaling in accordance with one non-limiting aspect of the present invention. The method may be embodied in a non-transitory computer-readable medium, or in multiple computer-readable mediums associated with one or more of the transmitter, controller and/or receiver, having a plurality of instructions sufficient to facilitate implementing the operations contemplated herein. The method may be utilized to facilitate transporting any type of wireless and/or wired signaling over any type of wired and/or wireless communication medium. The method is described with respect to facilitating transport of signal frames or other signal related intervals where identifiable portions of an input signal may be copied and time-delayed for subsequent transport and recover of noise affected portions from non-noise affected portions of the transported signaling. The method particularly relies on the transmitter or other source of the transported signaling having capabilities sufficient to create the contemplated time-delayed and copied signaling for transport without necessarily being limited to the transmitter configuration described above.

Block 102 relates to determining noise characteristics of a burst noise or other signaling influence likely to affect the transported signaling (Y). The determined noise characteristics may include assessing duration for one or more noise bursts expected to occur during signal transport between the transmitter and the receiver. The one or more burst noise expected to occur during transport may vary depending on a path or the communication medium being used, e.g., more or less burst noises, optionally of varying characteristics, may be determined when transmitting to a receiver located at a first location than when transmitting to a receiver located at a second, different location. The length may be measured in time or other metrics suitable to determining a value for $\tau$ that may be subsequently used to set the duration at which the burst-less signal (Y') processed with the frame reconstructor is driven to zero. In the event multiple noises are expected to influence signal transport, the value for $\tau$ may be selected to correspond with a longest one of the influences and/or multiple values for $\tau$ may be selected to individually correspond with the length of each of the influences.

Block 104 relates to generating the transported signal frame (Y) according to the determined noise characteristics. The transported signal frame (Y) may be generated by controlling the transmitter to create a time-delayed copy of the input signal frame (S) for each noise burst determined in Block 102, optionally where each successive time delayed signal frame is delayed by a multiple of $\tau$ and similarly scaled by a value of $k_i$. In this manner, the transmitter may be configured to transmit the transported signal frame (Y) with multiple copies or echoes of the input signal frame (S) in order to facilitate subsequent recovery of desired portions of the input signal frame (S) from one or more other portions of the transported signal frame (Y). The transmitter may be configured to generate the transported signal frame (Y) according to the following formula:

$$y(t)=s(t)+k1*s(t-1*\tau)+\ldots+kn*s(t-n*\tau),$$

where n is the number of expected noise bursts, the length of y(t) is $T_f$ and the length of s(t) is $T_f - n\tau$.

Block 106 relates to removing noise from the transported signal frame (Y) following transport. The noise may be removed by driving noise affected portions of the transported signal frame (Y) to zero, e.g., by driving the burst-less signal frame (Y') to zero for a period of time equal to $\tau$ where each of the portions driven to zero starts at a beginning of period of time associated with the corresponding noise burst ($T_i$). The burst noise detector may be configured to assess the beginning of each burst noise and to facilitate related control of the noise removal component, such as to generate the burst-less signal frame (Y') according to the following formula:

$$t=0 \text{ to } t=T_i => y'(t)=y(t)$$

where Ti is the instant in time at which the ith burst noise event of m noise burst events actually detected during transport occurs;

$$t=T_i \text{ to } T_i+\tau => y'(t)=\text{zero}$$

where i is any of the m noise burst events;

$$t=T_i+\tau \text{ to } T_{i+1} => y'(t)=y(t)$$

for any of the m bust events that occur $i+1 \leq m$ $$t=T_m+\tau \text{ to } T_f => y'(t)=y(t).$$

Block 108 relates to generating the output signal frame (Z) as a reconstruction of the input signal frame (S). The frame reconstructor may be configured to generate the output signal frame (Z) as a function of the burst-less signal frame (Y') using recursive processing whereby an entire length of the burst-less signal frame (Y') may be stored and then subsequently processed to solve for unknown components using known components. The frame reconstructor may be configured to generate the output signal frame (Z) according to the following formula:

$$\text{for } 0 \leq t < T_1 => z(t) = y'(t) - k_1 \cdot z(t-\tau) - \ldots - k_n \cdot z(t - n \cdot \tau)$$

where $z(t) = 0$ for $t < 0$;

$$\text{for } T_f - n \cdot \tau \geq t > T_m - (n-1) \cdot \tau => z(t) =$$

$$\frac{y'(t + n\tau) - k_{n-1}z(t+\tau) - k_{n-2}z(t+2\tau) - \ldots - z(t+n\tau)}{k_n}$$

for $T_m - (n-1) \cdot \tau \geq t \geq T_1 =>$ build a set of simultaneous equations using the equation below as follows:

$$y'(t+(n-1)\tau)=z(t+(n-1)\tau)+k_1z(t+(n-2)\tau)+k_2z(t+(n-3)\tau)+\ldots k_{n-1}z(t)+k_n z(t-\tau)$$

Since all values in the equation above are known except for the last two highlighted terms (z(t) and z(t-$\tau$)), the frame reconstructor can substitute t-$\tau$ for t until t<$T_1$+2$\tau$ to create a set of simultaneous equations and then solve the set of simultaneous equations for z(t), z(t−τ), z(t−2·τ), etc. . . . By working backwards in this manner once the entire burst-less signal frame (Y') is received, the frame reconstructor can reconstruct the portions of the burst-less signal frame (Y') driven to zero, and therefrom, generate the output signal frame (Z) as a reconstructions of the input signal frame (S).

As supported above, one non-limiting aspect of the present invention contemplates a methodology for burst noise cancellation in communication links using induced echo analysis. Additionally, the methodology may be configurable to deal with shot noises of a predefined maximum duration and dealing with multiple noise bursts on a single transmission. This becomes critical for communication links that suffer from high level of burst noise occurrences that limit the communication rates possible on that link.

One non-limiting aspect the present invention contemplates the transmitter being a cable modem termination system (CMTS) configured to transmit data related signaling and the receiver being a cable modem or other termination station configured to process the received signaling, e.g., processing the received signaling for data transmission to a tablet computer connected by way of a home network to the cable modem. One non-limiting aspect of the present invention contemplates the transmitter being a head end or other source of media and/or television related signaling and the receiver being a set-top box, a television or other device having capability sufficient to facilitate processing the received signaling, e.g., processing the received signaling for output of a television program to a television for viewing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for transmitting data from a transmitter comprising:
   providing a first signal frame for transmission;
   generating a value n representative of a quantity of expected burst noises expected to affect transmission of the first signal frame;
   generating a value τ as a function of a duration of one of the expected burst noises;
   generating a value k as a function of a desired amount of magnification or de-magnification of the first signal frame when time-delayed; and
   generating a second signal frame for transmission from the transmitter in place of the first signal frame, the second signal frame being generated as a function of the first signal frame according to the following formula:

$$y(t)=s(t)+k1*s(t-1*\tau)+\ldots+kn*s(t-n*\tau)$$

wherein t represents time, s(t) represents the first signal frame over time and y(t) represents the second signal frame over time.

2. The method of claim 1 further comprising determining the value τ to correspond with the duration of the one of the expected burst noises having the longest duration.

3. The method of claim 2 further comprising determining the expected burst noises for a communication medium interconnecting the transmitter with a receiver of the second signal frame.

4. The method of claim 3 further comprising determining the expected burst noises to correspond with a first plurality of burst noises in the event the communication medium is a first one of a plurality of communication mediums and to correspond with a second plurality of burst noises in the event the communication medium is a second one of the plurality of communication mediums, the first one of the plurality of communication mediums causing the second signal frame to be exposed to different burst noises than when transmitted over the second one of the plurality of communication mediums.

5. The method of claim 1 further comprising facilitating communication of the values determined for τ and k to a receiver configured to receive the second signal frame when transmitted over a communication medium.

6. A non-transitory computer-readable medium having a plurality of non-transitory instructions stored thereon which when executed with a processor of a transmitter are sufficient to facilitate transmission of noise reduced signal frames over a communication medium, the non-transitory computer-readable medium comprising non-transitory instructions sufficient for:
   processing a first signal frame desired for transmission;
   determining a duration of at least one noise desired to be eliminated from influencing the communication medium; and
   generating a second signal frame for transmission by the transmitter over the communication medium in place of the first signal frame, the second signal frame including the first signal frame plus at least one time-delayed copy of the first signal frame with at least a first one of the at least one time-delayed copy being delayed relative to the first signal frame by an amount equal to the duration of the at least one noise such that the second signal frame is longer than the first signal frame.

7. The non-transitory computer-readable medium of claim 6 further comprising instructions sufficient for determining the duration to correspond with a longest one of a plurality of noises desired to be eliminated.

8. The non-transitory computer-readable medium of claim 7 further comprising instructions sufficient for generating the second signal frame to include multiple time-delayed copies of the first signal frame, one for each of the plurality of noises desired to be eliminated.

9. The non-transitory computer-readable medium of claim 8 wherein each one of the multiple time-delayed copies after the first one is successively delayed relative to the preceding one by the amount equal to the duration such that a second one is delayed relative to the first one, a third one, if any, is delayed relative to the second one, and a fourth one, if any, is delayed relative to the third one.

10. The non-transitory computer-readable medium of claim 7 further comprising instructions sufficient for determining the plurality of noises desired to be eliminated depending on the communication medium for transmitting the second signal frame to a receiver.

11. The non-transitory computer-readable medium of claim 10 further comprising instructions sufficient for determining a first plurality of the plurality of noises in the event the communication medium is a first one of a plurality of communication mediums and determining a second plurality of the plurality noises in the event the communication medium is a second one of the plurality of communication mediums.

12. The non-transitory computer-readable medium of claim 11 further comprising instructions sufficient for determining at least a portion of the first plurality of the plurality noises to be different in length than the second plurality of the plurality of noises.

13. A system for transmitting data comprising:
a transmitter for transmitting a first signal to an output of the transmitter for transmission over a communication medium, the transmitter generating the first signal by combining a second signal received at an input of the transmitter with one or more echoes of the second signal, the transmitter generating each one or more echo according to a common duration, the common duration corresponding with a longest noise expected to affect transmission of the first signal over the communication medium; and
a controller for determining the longest noise and correspondingly controlling the transmitter to generate the first signal as a function thereof.

14. The system of claim 13 wherein the transmitter generates each one or more echo using a corresponding weighted tap line connected to the input, each weighted tap line including a delay and an amplifier dynamically adjusted by the controller according the longest noise.

* * * * *